(12) United States Patent
Baltar et al.

(10) Patent No.: US 11,757,994 B2
(45) Date of Patent: Sep. 12, 2023

(54) COLLECTIVE PERCEPTION MESSAGING FOR SOURCE-SINK COMMUNICATION

(71) Applicant: Intel IP Corporation, Santa Clara, CA (US)

(72) Inventors: Leonardo Gomes Baltar, Munich (DE); Dario Sabella, Munich (DE); Ingolf Karls, Feldkirchen (DE); Honglei Miao, Nuremberg (DE); Kilian Roth, Munich (DE); Markus Dominik Mueck, Unterhaching (DE)

(73) Assignee: Intel Corporation, Santa Clara, CA (US)

( * ) Notice: Subject to any disclaimer, the term of this patent is extended or adjusted under 35 U.S.C. 154(b) by 1471 days.

(21) Appl. No.: 15/714,480

(22) Filed: Sep. 25, 2017

(65) Prior Publication Data

US 2019/0098088 A1    Mar. 28, 2019

(51) Int. Cl.
*H04L 67/12* (2022.01)
*H04L 43/08* (2022.01)
(Continued)

(52) U.S. Cl.
CPC .............. *H04L 67/12* (2013.01); *H04L 43/08* (2013.01); *H04L 67/303* (2013.01); *H04W 4/40* (2018.02); *H04L 67/567* (2022.05)

(58) Field of Classification Search
CPC ....... H04L 67/12; H04L 43/08; H04L 67/303; H04L 67/2838; H04W 4/40
See application file for complete search history.

(56) References Cited

U.S. PATENT DOCUMENTS 9,275,417 B2   3/2016   Binion et al.
9,406,177 B2   8/2016   Attard et al.
(Continued)

FOREIGN PATENT DOCUMENTS

DE   112018005449      8/2020
EP      3121762 A1    1/2017
(Continued)

OTHER PUBLICATIONS

"International Application Serial No. PCT/US2018/051493, International Search Report dated Jan. 14, 2019", 3 pgs.
(Continued)

*Primary Examiner* — Jefferey F Harold
*Assistant Examiner* — Franklin S Andramuno
(74) *Attorney, Agent, or Firm* — Schwegman Lundberg & Woessner, P.A.

(57) ABSTRACT

Various techniques for collective perception messaging are disclosed herein. In an example, a machine receives, from a source device, a signal value for provision to a sink device, the signal value corresponding to a measurement of an environmental value. The machine accesses, from a storage device, an error term for the signal value. The machine accesses, from the storage device, a source reliability term for the source device. The machine accesses, from the storage device, a source-sink relation term based on the source device and the sink device. The machine determines a distribution for the environmental value based on the error term, the source reliability term, and the source-sink relation term. The machine determines, based on the distribution for the environmental value, whether the signal value is reliable.

25 Claims, 3 Drawing Sheets

(51) Int. Cl.
*H04L 67/303* (2022.01)
*H04W 4/40* (2018.01)
*H04L 67/567* (2022.01)

(56) References Cited

U.S. PATENT DOCUMENTS

| | | | |
|---|---|---|---|
| 9,672,734 B1* | 6/2017 | Ratnasingam | G08G 1/0968 |
| 9,678,915 B2* | 6/2017 | Miura | G06F 13/4295 |
| 10,019,299 B2* | 7/2018 | Park | G08G 1/163 |
| 10,234,867 B2* | 3/2019 | Kawabata | B60K 31/0058 |
| 10,257,647 B2* | 4/2019 | Kordybach | H04W 4/46 |
| 10,360,797 B2* | 7/2019 | Baghel | G08G 1/161 |
| 10,360,798 B2* | 7/2019 | Jerichow | G08G 1/0129 |
| 10,457,327 B2* | 10/2019 | Takamatsu | B60W 50/16 |
| 10,643,464 B2* | 5/2020 | Houssami | H04W 84/00 |
| 2002/0080617 A1* | 6/2002 | Niwa | B60Q 1/085 |
| | | | 362/465 |
| 2017/0123434 A1* | 5/2017 | Urano | G01S 19/42 |
| 2017/0161603 A1* | 6/2017 | Okanohara | G06N 3/04 |
| 2017/0214747 A1 | 7/2017 | Schulte et al. | |
| 2019/0333386 A1* | 10/2019 | Horita | B60W 30/0956 |

FOREIGN PATENT DOCUMENTS

| | | |
|---|---|---|
| WO | WO-2016108555 A1 | 7/2016 |
| WO | 2019060291 | 3/2019 |

OTHER PUBLICATIONS

"International Application Serial No. PCT/US2018/051493, Written Opinion dated Jan. 14, 2019", 5 pgs.

"International Application Serial No. PCT US2018 051493, International Preliminary Report on Patentability dated Apr. 9, 2020", 7 pgs.

* cited by examiner

COLLECTIVE PERCEPTION MESSAGING FOR SOURCE-SINK COMMUNICATION

TECHNICAL FIELD

Embodiments described herein generally relate to data transfer from an electronic data source to an electronic data sink. Some embodiments described herein generally relate to collective perception messaging for source-sink communication. Some embodiments relate to Fifth Generation (5G) collective perception for vehicle-to-everything (V2X). Some embodiments relate to data aggregation and source-sink-dependent data fusion.

BACKGROUND

Autonomous vehicles may communicate with other autonomous or human-controlled vehicles using vehicle-to-vehicle (V2V) communication and/or may communicate with any device using vehicle-to-everything (V2X) communication. Defining message types for V2V and/or V2X communication may be desirable.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, methods, configurations, device components, and related apparatuses are disclosed that provide collective perception messaging for source-sink communication. Specifically, the following description includes various examples of collective perception messaging and determining signal reliability.

In an example, the technology described herein provides collective perception messaging for source-sink communication. A machine receives, from a source device, a signal value for provision to a sink device, the signal value corresponding to a measurement of an environmental value. The machine accesses, from a storage device, an error term for the signal value. The machine accesses, from the storage device, a source reliability term for the source device. The machine accesses, from the storage device, a source-sink-relation term based on the source device and the sink device. The machine determines a distribution for the environmental value based on the error term, the source reliability term, and the source-sink-relation term. The machine determines, based on the distribution for the environmental value, whether the signal value is reliable. The machine provides an output representing the signal value in response to a determination that the signal value is reliable. The machine forgoes providing the output representing the signal value in response to a determination that the signal value is not reliable.

Some aspects relate to the vehicular communication context, which includes vehicle-to-vehicle (V2V) and vehicle-to-everything (V2X) communication. Some examples of the types of messages used in V2V and V2X communication are Cooperative Awareness Messages (CAM) and Decentralized Environmental Notification Messages (DENM). CAM is a periodic message used by an Intelligent Transport System (ITS) station (e.g., car, traffic sign, road closure sign, and the like) to indicate its presence. (E.g., "I am a car. I am at geolocation X. My velocity is 50 kilometers per hour and my direction is north.") DENM is an aperiodic message used to indicate that some event occurs. For example, a car may indicate that it suddenly breaks, a traffic sign may indicate that the road is slippery, and the like.

Figure 1:
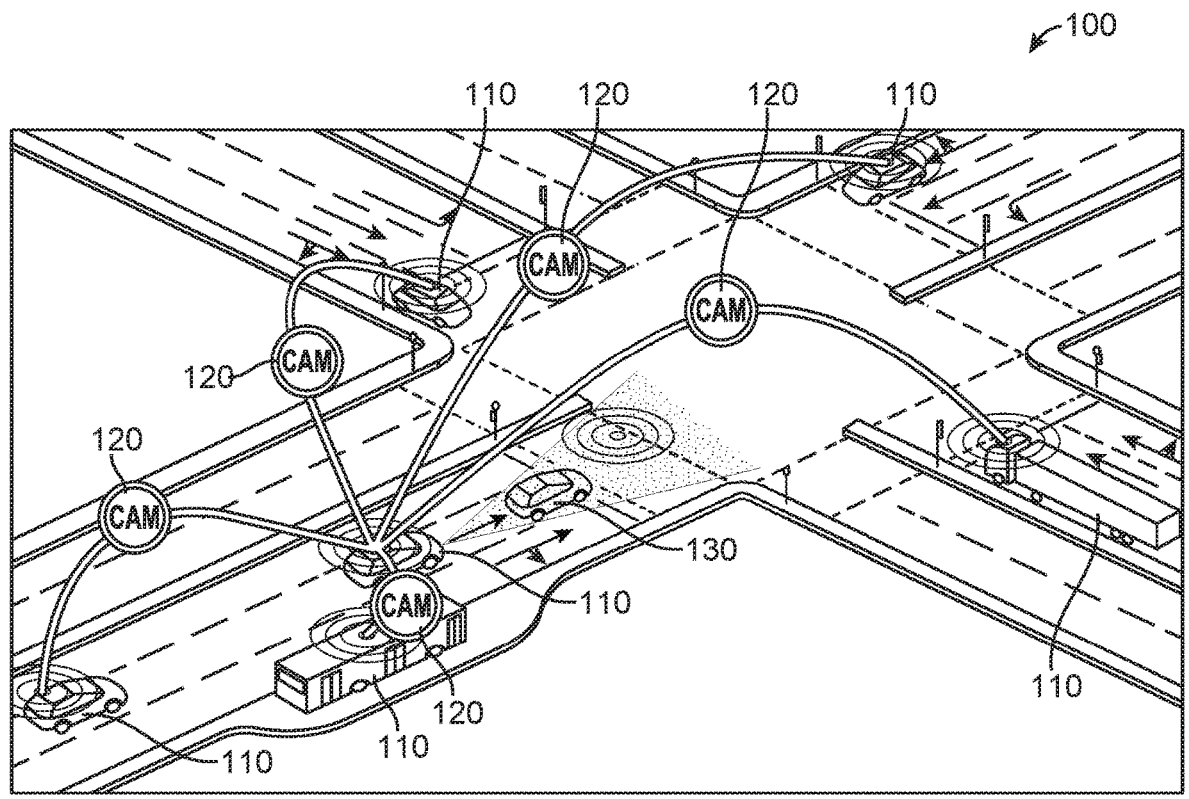
FIG. 1 illustrates a system in which vehicular communication may be implemented, according to an example.

FIG. 1 illustrates a system 100 in which vehicular communication may be implemented. As shown in the system 100, multiple vehicles 110 send CAM 120 to one another to indicate their presence, positions, velocities, directions, and the like. The CAM 120 may assist the vehicles 110 to safely navigate across the illustrated intersection. However, legacy vehicle 130 is not capable of V2V/V2X communication and does not send CAM 120.

Some aspects of the technology described herein relate to Collective Perception Messages (CPM). CAM and DENM messaging may not be sufficient to share sensor data (or other kinds of information) on the dynamic environment between vehicles (such as information about observed pedestrians, animals, children, and the like). CPM messaging is used to exchange dynamic environmental changes between vehicles or other devices (e.g., infrastructure devices). For example, vehicles and other devices may use CPM to communicate about pedestrians crossing the road, children playing next to the road, the presence of animals, and the like. In some cases, multiple vehicles may observe identical events, consistent aggregated information may increase the probability that the reported information is true. For example, if one vehicle detects ice on the road at a certain geolocation, the detection may be in error. However, if ten different vehicles confirm the presence of the ice at the geolocation, the detection is more likely to be correct.

One problem addressed by some aspects is how to aggregate CPM information from multiple sources. Different sensing devices observe the direct surrounding area and communicate this information to other devices. Since multiple devices might observe the same observation, it may be useful to combine the observations to make a more reliable decision.

In some schemes, the level of reliability of information only depends on the source of the information. In some implementations, the level of reliability of information depends on both the source and the sink. Some implementations may improve the overall vehicular (sensor) data reliability measurement, taking into account the knowledge the sink has about the source. For example, a vehicle manufactured by ABC may trust information from other ABC vehicles more than it trusts vehicles manufactured by DEF because all ABC vehicles have trustworthy sensors that are verified by the manufacturer. ABC may not trust or not be aware of the quality of the sensors in the DEF vehicle, and may only have limited information about such sensors.

In one example, if a vehicle manufactured by ABC receives information from a sensor in another vehicle manufactured by ABC, the reliability will be considered to be high (since ABC knows the characteristics and types of the sensors). However, if a vehicle manufactured by ABC receives information from a sensor in a vehicle manufactured by DEF, the reliability will be considered to be lower, since ABC only has limited information about the DEF sensor.

In a vehicular communication (V2V or V2X) context, sensor data from multiple sources of distinct manufacturers (mainly sensors in vehicles and on the roadside) are provided to an aggregation node, which may reside in a vehicle or at an external server. A framework for data fusion is provided herein, which takes properties of the data source and properties of the data sink into account for the data fusion. For example, a vehicle manufactured by ABC may trust a sensor by ABC more than it trusts a sensor by another manufacturer.

Aspects disclosed herein relate to a perceptive communication framework (vehicles sharing observations on dynamic environment changes). Aspects provide a framework on how to handle trust in sensor data—considering a source-sink relation (e.g., trust relationship) that depends on the respective manufacturers (or other data about the sensors).

Aspects disclosed herein relate to End User Devices (UEs). UEs may, for example, be used in the form of Mobile Devices, Smartphones, personal digital assistants (PDAs), laptops, and the like. A UE may have wireless capabilities, and the like. To give an example, an End User may carry such a device and may provide information to the eco-system. The information may include, for example, informing vehicles about the presence of the user on the road, on a sidewalk, and the like. The information may also include behavioral information, for example, a child may be running close to the road and any unexpected dangerous situation may be anticipated in case that child runs onto the street. Similar to the other cases described in this document, there may be several levels of trust for specific UE sensors/data provision sources by the eco-system (e.g., vehicles receiving and processing the information).

In addition, a UE may be a consumer of the information provided by the eco-system. For instance, the UE may receive information on the traffic situation from vehicles in its proximity. The user may receive a warning if a dangerous situation arises, for example, if the user unintentionally steps onto the road and a vehicle is arriving. Similar to the other cases of this document, there may be several levels of trust for specific UE/eco-system sensors/data provision sources by the target UE. In one example, a UE of a first manufacturer may have a higher level of trust for in-vehicle sensor data if the sensor is manufactured by the first manufacturer, while the UE of the first manufacturer may have a lower level of trust for an in-vehicle sensor manufactured by a second manufacturer.

It should be noted that the manufacturer is only one factor that may (or may not) be considered when determining the source-sink relation. Other data, for example, year of manufacture, last service date, feedback or history of sensor accuracy, and the like may also be considered in setting the source-sink relation. Also, while some examples are described in the vehicular communication context, the technology described herein may also be used in other contexts, such as robotics, Internet of Things (IoT) communication in a smart home, intra-device communication in a smart scientific laboratory, and the like.

Some aspects of the technology described herein communicate observed environment information to infrastructure elements, (e.g., in traffic lights or similar) or to vehicles directly. The infrastructure and the surrounding vehicles may receive identical or quasi-identical (and possibly also contradicting, erroneous, etc.) information from multiple neighboring sources. A machine residing within the sink device receiving the information or outside the sink device aggregates the combined information and determines a most likely estimate.

The sensing device or vehicle transmits information about the observed objects to the surrounding area or even the network. This information may include the following elements: object type, object speed, object position/geolocation, observation time, observation validity period, reliability of observation, source identifier (e.g., sensor in a vehicle manufactured by manufacturer ABC, sensor in a traffic light, etc.).

Equation 1 represents a vector of sensor-measured values y in the data fusion context. In the data fusion context, there are N observations (numbered k=1 ... N) of a value, which may represent, for example, a position of an object on a road. Each observation is associated with a sensor k and is denoted $y_k$ in Equation 1. Each observation may come from a different source (e.g., a different vehicle or infrastructure device), the source having a reliability $R_k$. ($R_k$ may represent the "trustworthiness" of a source.) The representation shown in Equation 1, may be used, where $x_k$ is the true environmental value (which may change between observations, for example, if the object on the road changes positions) and se represents the error term, where $y_k = x_k + \varepsilon_k$, and the event observed by each sensor is represented as a 2-tuple $(y_k, R_k)$.

$$[y] = \begin{pmatrix} (y_1, R_1) \\ (y_2, R_2) \\ \ldots \\ (y_N, R_N) \end{pmatrix} = \begin{pmatrix} (x_1 + \varepsilon_1, R_1) \\ (x_2 + \varepsilon_2, R_2) \\ \ldots \\ (x_N + \varepsilon_N, R_N) \end{pmatrix} \quad \text{Equation 1}$$

Some aspects of the technology described herein extend the data fusion approach of Equation 1 by including a Source-Sink Relation (SSR) variable. This changes the 2-tuple representing each event above to a 3-tuple $(y_k, R_k, SSR_k)$. The vector y representing the sensor-measured values in conjunction with the 3-tuple is shown in Equation 2.

$$[y] = \begin{pmatrix} (y_1, R_1, SSR_1) \\ (y_2, R_2, SSR_2) \\ \ldots \\ (y_N, R_N, SSR_N) \end{pmatrix} = \begin{pmatrix} (x_1 + \varepsilon_1, R_1, SSR_1) \\ (x_2 + \varepsilon_2, R_2, SSR_2) \\ \ldots \\ (x_N + \varepsilon_N, R_N, SSR_N) \end{pmatrix} \quad \text{Equation 2}$$

Some aspects of the technology described herein are directed to the SSR. The SSR is a value taken from a table (or other data structure), stored in a storage unit (e.g., a memory or a disk) and arranged by source type (e.g., Manufacturer ABC, Manufacturer DEF, Manufacturer GHI, etc.) and sink type (e.g., Manufacturer ABC, Manufacturer DEF, Manufacturer GHI, etc.). For each combination of source and sink, a SSR value is defined, for example, ranging between 0 (lowest reliability/trust) and 1 (highest reliability/trust). An example SSR table is shown in Table 1.

TABLE 1

| Sink | Source | | |
|---|---|---|---|
| | Manufacturer ABC | Manufacturer DEF | Manufacturer GHI |
| Manufacturer ABC | 1.0 | 0.7 | 0.8 |
| Manufacturer DEF | 0.8 | 1.0 | 0.1 |
| Manufacturer GHI | 0.4 | 0.9 | 1.0 |

It should be noted that, in Table 1, the top-left to bottom-right diagonal has values of 1.0 because all sinks of a given manufacturers assign a maximum trust/reliability for sources of the same manufacturer. It should also be noted that Table 1 is not symmetrical with respect to the top-left to bottom-right diagonal (e.g., Manufacturer GHI's sinks assign a high SSR of 0.9 to sources of Manufacturer DEF, but Manufacturer DEF's sinks assign a low SSR of 0.1 to Manufacturer GHI's sources). In other embodiments, one or both of the above rules may or may not apply. In some cases, the SSR values may depend on the amount of collaboration or exchange of sensor specifications between source and sink manufacturers. In some cases, a source device may not know the SSR value that a sink device has assigned to it, and the SSR value may be stored at an external server or at the sink device.

The approach may be used for any type of sensors in the V2X (or other) ecosystem. While only sensors associated with manufacturers are shown, data from sensors carried by pedestrians (e.g., a pedestrian's mobile phone indicating that he/she is crossing the road) or infrastructure-based sensors (e.g., on a traffic light, toll pass reader or road sign) may also be assigned SSR values and included in the SSR table (or other data structure).

Furthermore, Table 1 uses numeric values. However, SSR values might not necessarily be numeric. Values such as "very reliable," "reliable," and "not reliable" or color codes associated with SSR values may be used.

In some cases, the values of the SSR table (or other data structure) are updated continuously (or on a defined time basis). For example, machine learning may be used, by a source device manufacturer, to learn the reliability of sensors from various sink device manufacturers. In one example of the machine learning algorithm, multiple different sensors from the same manufacturer report very different measured values for the same environmental value. In response, the sink device manufacturer reduces its SSR value for the same manufacturer associated with the multiple different sensors. In another example, a set of measured values from a manufacturer of source devices have standard deviations that are increasing over time. In response, the manufacturer of the sink device decreases its SSR value for that manufacturer.

Some aspects of the technology described herein attempt to extract the environmental value [x] from the measured values [y] of Equation 2. In some cases, the source reliability $R_k$ and the source-sink relation $SSR_k$ are converted into additive noise terms, represented by e, as shown in Equation 3. Equation 4 applies in the context of Equation 3 and represents a conversion of the Source reliability "$R_k$" into a suitable, representative noise term (added as a random variable following a Gaussian distribution, the various random variables being mutually independent, i.e., the cross-correlation of the random variables being zero). Typically, a high reliability leads to a small additional noise value while a low reliability leads to a high additional noise value. In other words, the same condition as Equation 4 applies to the error for the SSR—$\varepsilon(SSR)$.

$$(x_k + \varepsilon_k, R_k, SSR_k) \rightarrow (x_k + \varepsilon_k + \varepsilon(R_k) + \varepsilon(SSR_k)) \quad \text{Equation 3}$$

$$\varepsilon(R_k) \sim N(\varepsilon^2(R_k), 0) \quad \text{Equation 4}$$

Equation 4 indicates that the statistical distribution (Probability Density Function (PDF)) of $R_k$ is assumed to be a normal (or approximately normal) distribution. The first term inside the parenthesis represents the variance, and the second term represents the mean. The approach of Equation 3 and Equation 4 leads to the observation vector of Equation 5.

$$[y] = \begin{pmatrix} (y_1, R_1, SSR_1) \\ (y_2, R_2, SSR_2) \\ \ldots \\ (y_N, R_N, SSR_N) \end{pmatrix} = \quad \text{Equation 5}$$

$$\begin{pmatrix} (x_1 + \varepsilon_1 + \varepsilon(R_1) + \varepsilon(SSR_1)) \\ (x_2 + \varepsilon_2 + \varepsilon(R_2) + \varepsilon(SSR_2)) \\ \ldots \\ (x_N + \varepsilon_N + \varepsilon(R_N) + \varepsilon(SSR_N)) \end{pmatrix} = \begin{pmatrix} (x_1 + \varepsilon_{tot,1}) \\ (x_2 + \varepsilon_{tot,2}) \\ \ldots \\ (x_N + \varepsilon_{tot,N}) \end{pmatrix}$$

Finally, the extraction of the true environmental values $x_k$ from $y_k$ is done using, for example, a standard minimum-mean-square-error estimator with the standard deviation $\sigma_k$ being defined by Equation 6. The variance of the observed data is observed to be unitary, as shown in Equation 7. Equation 7 represents an assumption that $x_k$ has unitary (normalized) power, represented here by its variance, and the zero mean. Equation 8 defines how the environmental values x are extracted. In Equation 8, I represents the identity matrix.

$$\sigma_k^2 = E[|\varepsilon_{tot,k}|^2] \quad \text{Equation 6}$$

$$E[|x_k|^2] = 1 \quad \text{Equation 7}$$

$$[\hat{x}] = (I + \text{diag}\{\sigma_1^2, \sigma_2^2, \ldots, \sigma_N^2\})^{-1} [y] \quad \text{Equation 8}$$

In a special case of Equation 8, if the true environmental values are related to the same event, i.e., $x_k = x$, then Equation 8 may be reduced to Equation 9. In Equation 9, $a \in R^N$ is a vector with all entries of one, and $A \in R^{N \times N}$ is N-by-N matrix of all ones.

$$\hat{x} = a^T (A + \text{diag}\{\sigma_1^2, \sigma_2^2, \ldots, \sigma_N^2\})^{-1} [y] \quad \text{Equation 9}$$

Figure 2:
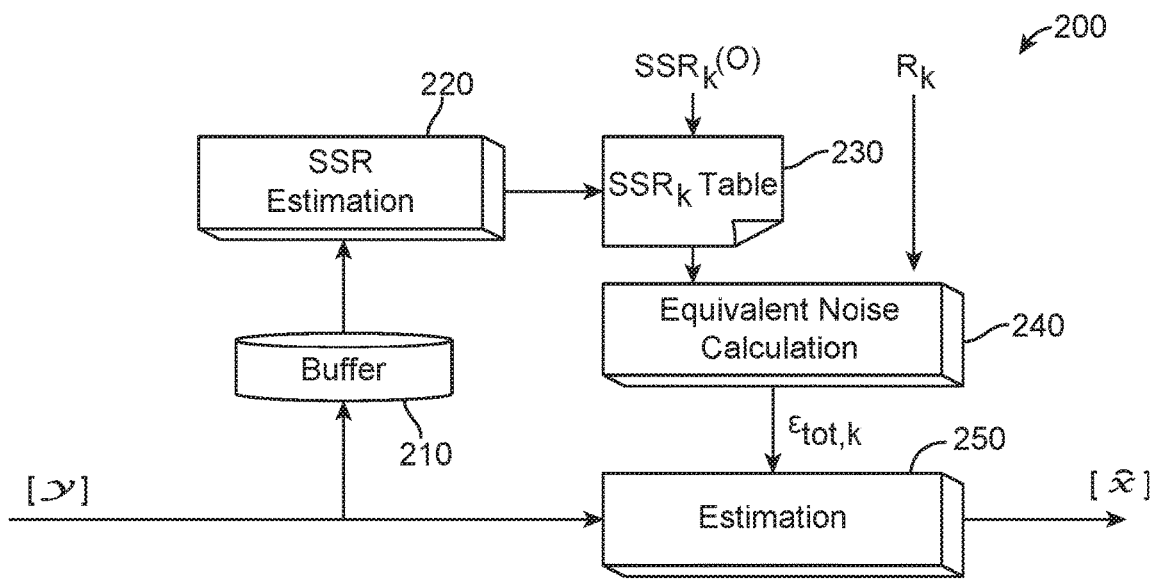
FIG. 2 illustrates a schematic diagram for extracting an estimate of an environmental value, according to an example.

FIG. 2 illustrates a schematic diagram 200 for extracting an estimate of an environmental value. According to the schematic diagram 200, the values of [y] are provided to a buffer 210 and an estimation component 250. The buffer 210 communicates with SRR estimation component 220, which gets SRR values from the $SRR_k$ table 230. The $R_k$ and $SRR_k$ values are input to the equivalent noise calculation component 240, which computes $\varepsilon_{tot,k}$ and provides the value of $\varepsilon_{tot,k}$ to the estimation component 250. The estimation component 250 computes [x] based on [y] and $\varepsilon_{tot,k}$.

In some examples, suitable weights are provided to the observations according to Equation 10.

$$y_k = x_k + \varepsilon_k; \text{ typically } x_k = x \quad \text{Equation 10}$$

The estimation associated with Equation 10 is set forth in Equation 11.

$$\hat{x} = \alpha_1 y_1 + \alpha_1 y_2 + \ldots + \alpha_N y_N; \text{ typically } \alpha_1 + \alpha_2 + \ldots + \alpha_N = 1 \quad \text{Equation 11}$$

For Equation 11, the weighting factors are suitably chosen. For example, if the noise variance of all observations is equal, a choice $\alpha_k=1/N$ for all k may be suitable. In other cases, the weighting factors are chosen to minimize the overall mean square error for the final estimate.

It should be noted that other information, in addition to that described above, may be taken into account in determining the reliability of measurements. For example, in front of a school there may be a lot of children entering and leaving the school during the start and end times of the school day. This happens on school days, but not on weekends, holidays, or school vacations. This information may be taken into account when processing the reliability of a detection of values associated with children being present.

An aggregation point combines multiple observations to make a decision. An aggregation point may be a vehicle or a network device external to the vehicle. In some cases, each vehicle makes a decision on its own based on an algorithm defined by the manufacturer. Thus, the aggregation point may be either static (and provided by the network) or dynamically decided by the vehicle or other device implementing the technology.

Some aspects differentiate data that is (i) given as information to the driver, and (ii) used for autonomous driving decisions. Since the number of observed objects in a local area may, in some cases, be very large, it may be useful to filter for the most relevant information for a human driver. In some cases, only life critical information is provided to the driver, so as not to unnecessarily distract him/her. An autonomous vehicle may process all available information, thus all the observations or decisions about the true environmental values may, in some cases, be provided to the autonomous vehicle.

In some cases, information may change rapidly over time. Thus, according to some aspects, a timestamp is associated with the observed/measured values. For example a first vehicle might observe a deer close to the road and transmit this information to the network. For another vehicle passing through this part of the road shortly after the first vehicle, this might be relevant information. However, for other vehicles passing hours later, this might no longer be relevant.

To prevent the transmission of possible false data to manipulate the decision making, an authentication procedure may ensure that an unaltered sensor device is used to provide the measured values. The sensor devices may authenticate themselves to the network using a temporary key each time the vehicle including the sensor devices starts operation or once every threshold time period (e.g., once per hour) during a period of extended vehicle operation. In an alternative embodiment, the transmission of the sensor data may include a field indicating if the device is authenticated as an unaltered device or not. Data from an altered sensor should be labeled as unreliable and either not provided to the human driver or not used in autonomous driving decision making.

Figure 3:
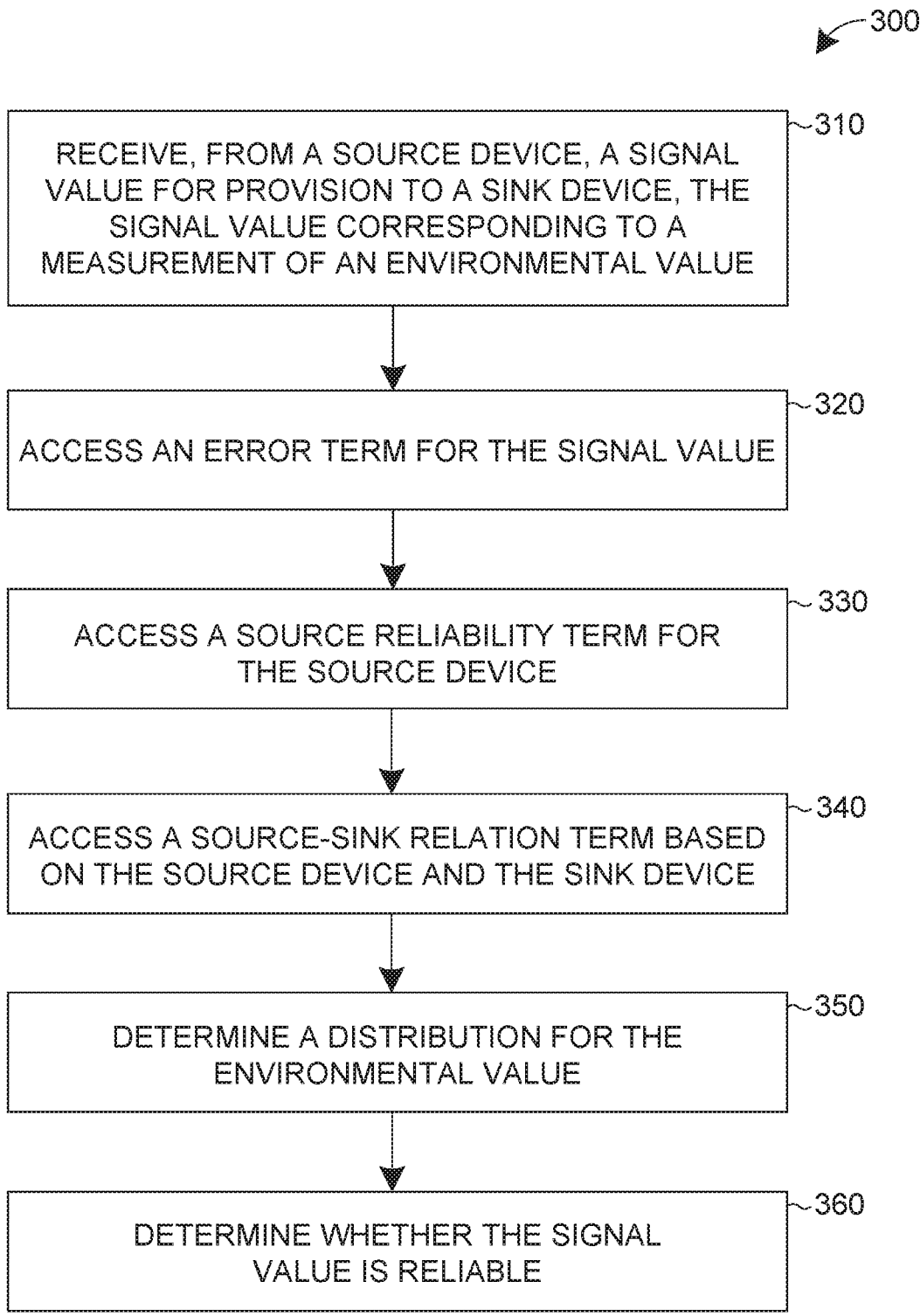
FIG. 3 illustrates a flowchart of a method for determining whether a signal value is reliable, according to an example.

FIG. 3 illustrates a flowchart of a method 300 or determining whether a signal value is reliable. The method 300 may be implemented at a machine. The machine may reside within a sink device or externally to the sink device. If the machine resides externally to the sink device, the machine communicates with the sink device via a network. The machine communicates with a source device via a network.

In some examples, the source device is a source motor vehicle and the sink device is a sink motor vehicle. Alternatively, one or both of the source device and the sink device may not be motor vehicles. For instance, the source device may be an infrastructure device or a pedestrian device (e.g., a mobile phone of a pedestrian).

At operation 310, the machine receives, from the source device, a signal value for provision to a sink device. The signal value corresponds to a measurement of an environmental value. For example, the environmental value may be an ambient temperature. The true environmental value may be 20 C. However, the signal value may be 21 C due to error in the sensor (e.g., thermometer) taking the measurement.

At operation 320, the machine accesses, from a storage device, an error term for the signal value. The storage device may reside within the machine or externally to the machine. The storage device may be a component of the memory of the machine.

At operation 330, the machine accesses, from the storage device, a source reliability (SR) term for the source device.

At operation 340, the machine accesses, from the storage device, a source-sink relation (SSR) term based on the source device and the sink device. The SSR term may be stored in a table (or other data structure) at the storage device. The table may have a first dimension (e.g., rows) representing a manufacturer or device identifier (or set of device identifiers) of the source device and a second dimension (e.g., columns) representing a manufacturer or device identifier (or set of device identifiers) of the sink device. In some examples, the error term includes a noise term representing possible differences between the signal value and the environmental value. The SR term and the SSR term may represent additive or multiplicative noise terms.

In some cases, the SSR term for the source device and the sink device is determined using machine learning. The machine learning may take into account the features of multiple past signal values from devices having a device type of the source device to devices having a device type of the sink device. The features may include an indicated reliability of the multiple past signal values. The machine learning may take into account the features of multiple past signal values for a same environmental value from devices having a device type of the source device to devices having a device type of the sink device. The features may include a standard deviation of the multiple past signal values for the same environmental value.

At operation 350, the machine determines a distribution for the environmental value based on the error term, the SR term, and the SSR term.

At operation 360, the machine determines, based on the distribution for the environmental value, whether the signal value is reliable. In some cases, the machine determines whether the signal value is reliable based on a standard deviation or a range of the distribution. For example, the signal may be reliable if the standard deviation is less than a threshold standard deviation value, and unreliable otherwise. The signal may be reliable if the range is less than a threshold range, and unreliable otherwise.

The machine provides (e.g., to the sink device) an output representing the signal value in response to a determination that the signal value is reliable. The output may be provided in a CPM. If the sink device is the sink motor vehicle, the output may be provided for display at a display panel of the sink motor vehicle. If the sink device is an autonomous vehicle, a motor vehicle operation decision (e.g., adjusting a speed of the autonomous vehicle or adjusting a trajectory of the autonomous vehicle) for the sink device may be made based on the signal value. The machine forgoes providing the output representing the signal value in response to a determination that the signal value is not reliable.

Aspects of the technology described herein relate to the CPM message type. Aspects of the technology described herein relate to using the SSR variable to define a more descriptive data fusion approach. In some cases, the SSR is transmitted within a CPM or measured values modified by the SSR are transmitted within the CPM.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS). Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra. LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS). Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network. or GAN standard), Zigbee, Bluetooth®, Wireless Gigabit Alliance (WiGig) standard, mmWave standards in general (wireless systems operating at 10-300 GHz and above such as WiGig, IEEE 802.1 lad, IEEE 802.1 lay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V21) and Infrastructure-to-Vehicle (12V) communication technologies, 3GPP cellular V2X, DSRC (Dedicated Short Range Communications) communication systems such as Intelligent-Transport-Systems and others, the European ITS-G5 system (i.e., the European flavor of IEEE 802.11p based DSRC, including ITS-GSA (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5.855 GHz to 5,875 GHz), ITS-G5C (i.e., Operation of ITS applications in the frequency range 5,470 GHz to 5,725 GHz)), etc.

Aspects described herein can be used in the context of any spectrum management scheme including dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies). Applicable spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc). Note that some bands are limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g., by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.].

Some of the features in this document are defined for the network side, such as Access Points, eNodeBs, etc. Still, a User Equipment (UE) may take this role as well and act as an Access Points, eNodeBs, etc. I.e., some or all features defined for network equipment may be implemented by a UE.

Figure 4:
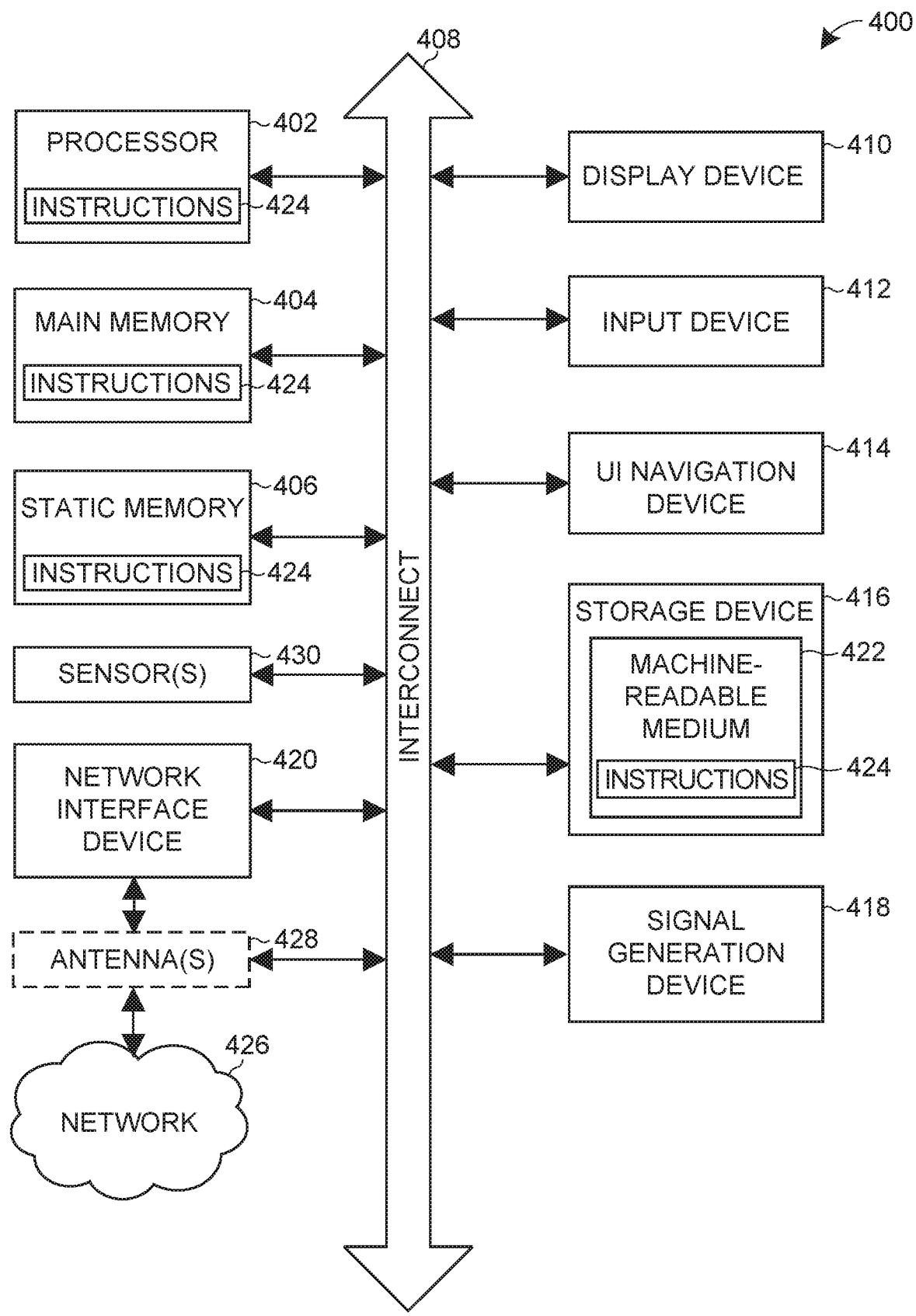
FIG. 4 illustrates a block diagram for an example computer system architecture upon which any one or more of the techniques (e.g., operations, processes, methods, and methodologies) discussed herein may be performed, according to an example.

FIG. 4 is a block diagram illustrating a machine in the example form of a computing system (e.g., computing device) 400, within which a set or sequence of instructions may be executed to cause the machine to perform any one of the methodologies discussed herein, according to an example embodiment. The machine may be a personal computer (PC), a tablet PC, a hybrid tablet/notebook PC, a personal digital assistant (PDA), a mobile telephone or smartphone, a wearable computer, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 400 includes at least one processor 402 (e.g., a central processing unit (CPU), a graphics processing unit (GPU) or both, processor cores, compute nodes, etc.), a main memory 404 and a static memory 406, which communicate with each other via an interconnect 408 (e.g., a link, a bus, etc.). The processor(s) 402 of the computer system 400 are hardware processors and may correspond to processing hardware of the machine. One or more processors 402 may correspond to a hardware processor array. The computer system 400 may further include a video display unit 410, an alphanumeric input device 412 (e.g., a keyboard), and a user interface (UI) navigation device 414 (e.g., a mouse). In one embodiment, the video display unit 410, input device 412 and UI navigation device 414 are incorporated into a touch screen display. The computer system 400 may additionally include a storage device 416 (e.g., a drive unit), a signal generation device 418 (e.g., a speaker), an output controller 432, a network interface device 420 (which may include or operably communicate with one or more antennas 428, transceivers, or other wireless communications hardware), and one or more sensors 430, such as a global positioning system (GPS) sensor, compass, accelerometer, location sensor, or other sensor.

The storage device 416 includes a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404, static memory 406, and/or within the processor 402 during execution thereof by the computer system 400, with the main memory 404, static memory 406, and the processor 402 also constituting machine-readable media.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 424 may further be transmitted or received over a communications network 426 via an antenna 428 using a transmission medium via the network interface device 420 utilizing any one of a number of well-known transfer protocols (e.g., HTTP). Examples of communication networks include a local area network (LAN), a wide area network (WAN), the Internet, mobile telephone networks, plain old telephone service (POTS) networks, and wireless data networks (e.g., Wi-Fi, 2G/3G, 4G LTE/LTE-A, 5G or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Embodiments used to facilitate and perform the techniques described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices. Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a system for source-sink communication comprising: processing hardware of a machine; and a memory device storing instructions which, when executed by the processing hardware, cause the processing hardware to: receive a plurality of data items, each data item from the plurality of data items being associated with a source; access, for each data item, a source reliability term based on the source, the source reliability term being accessed from a server; access, for each data item, a source-sink relation term, the source-sink relation term being accessed from a local storage of the machine, the source-sink relation term being updated, at the machine, based on reliability of other data items associated with sources having a same type as the source; determine, for each data item, whether each data item is reliable based on the source reliability term and the source-sink relation term; and provide an output representing reliable data items from the plurality of data items.

In Example 2, the subject matter of Example 1 includes, wherein the same type as the source comprises a same manufacturer as the source.

In Example 3, the subject matter of Examples 1-2 includes, wherein the source comprises a user equipment (UE).

In Example 4, the subject matter of Examples 1-3 includes, wherein the source comprises a motor vehicle.

In Example 5, the subject matter of Examples 1-4 includes, wherein the machine comprises a user equipment (UE).

In Example 6, the subject matter of Examples 1-5 includes, wherein the machine comprises a motor vehicle.

In Example 7, the subject matter of Examples 1-6 includes, wherein the output comprises a collective perception message (CPM).

Example 8 is at least one machine-readable medium for source-sink communication storing instructions which, when executed by processing hardware of a machine, cause the processing hardware to: receive a plurality of data items, each data item from the plurality of data items being associated with a source; access, for each data item, a source reliability term based on the source, the source reliability term being accessed from a server; access, for each data item, a source-sink relation term, the source-sink relation term being accessed from a local storage of the machine, the source-sink relation term being updated, at the machine, based on reliability of other data items associated with sources having a same type as the source; determine, for each data item, whether each data item is reliable based on the source reliability term and the source-sink relation term; and provide an output representing reliable data items from the plurality of data items.

In Example 9, the subject matter of Example 8 includes, wherein the same type as the source comprises a same manufacturer as the source.

In Example 10, the subject matter of Examples 8-9 includes, wherein the source comprises a user equipment (UE).

In Example 11, the subject matter of Examples 8-10 includes, wherein the source comprises a motor vehicle.

In Example 12, the subject matter of Examples 8-11 includes, wherein the machine comprises a user equipment (UE).

In Example 13, the subject matter of Examples 8-12 includes, wherein the machine comprises a motor vehicle.

In Example 14, the subject matter of Examples 8-13 includes, wherein the output comprises a collective perception message (CPM).

Example 15 is a method for source-sink communication comprising: receiving, at a machine, a plurality of data items, each data item from the plurality of data items being associated with a source; accessing, for each data item, a source reliability term based on the source, the source reliability term being accessed from a server; accessing, for each data item, a source-sink relation term, the source-sink relation term being accessed from a local storage of the machine, the source-sink relation term being updated, at the machine, based on reliability of other data items associated with sources having a same type as the source; determining, for each data item, whether each data item is reliable based on the source reliability term and the source-sink relation term; and providing an output representing reliable data items from the plurality of data items.

In Example 16, the subject matter of Example 15 includes, wherein the same type as the source comprises a same manufacturer as the source.

In Example 17, the subject matter of Examples 15-16 includes, wherein the source comprises a user equipment (UE).

In Example 18, the subject matter of Examples 15-17 includes, wherein the source comprises a motor vehicle.

In Example 19, the subject matter of Examples 15-18 includes, wherein the machine comprises a user equipment (UE).

In Example 20, the subject matter of Examples 15-19 includes, wherein the machine comprises a motor vehicle.

Example 21 is an apparatus for source-sink communication comprising: means for receiving, at a machine, a plurality of data items, each data item from the plurality of data items being associated with a source; means for accessing, for each data item, a source reliability term based on the source, the source reliability term being accessed from a server; means for accessing, for each data item, a source-sink relation term, the source-sink relation term being accessed from a local storage of the machine, the source-sink relation term being updated, at the machine, based on reliability of other data items associated with sources having a same type as the source; means for determining, for each data item, whether each data item is reliable based on the source reliability term and the source-sink relation term; and means for providing an output representing reliable data items from the plurality of data items.

In Example 22, the subject matter of Example 21 includes, wherein the same type as the source comprises a same manufacturer as the source.

In Example 23, the subject matter of Examples 21-22 includes, wherein the source comprises a user equipment (UE).

In Example 24, the subject matter of Examples 21-23 includes, wherein the source comprises a motor vehicle.

In Example 25, the subject matter of Examples 21-24 includes, wherein the machine comprises a user equipment (UE).

In Example 26, the subject matter of Examples 21-25 includes, wherein the machine comprises a motor vehicle.

Example 27 is a system for source-sink communication comprising: processing hardware of a machine; and a memory device storing instructions which, when executed by the processing hardware, cause the processing hardware to: receive, from a source device, a signal value for provision to a sink device, the signal value corresponding to a measurement of an environmental value; access, from a storage device, an error term for the signal value; access, from the storage device, a source reliability term for the source device; access, from the storage device, a source-sink relation term based on the source device and the sink device; determine a distribution for the environmental value based on the error term, the source reliability term, and the source-sink relation term; determine, based on the distribution for the environmental value, whether the signal value is reliable; provide an output representing the signal value in response to a determination that the signal value is reliable; and forgo providing the output representing the signal value in response to a determination that the signal value is not reliable.

In Example 28, the subject matter of Example 27 includes, wherein the source-sink relation term is stored in a table at the storage device, the table having a first dimension representing a manufacturer or device identifier of the source device and a second dimension representing a manufacturer or device identifier of the sink device.

In Example 29, the subject matter of Examples 27-28 includes, wherein the error term comprises a noise term representing possible differences between the signal value and the environmental value, and wherein the source reliability term and the source-sink relation term represent additive noise terms.

In Example 30, the subject matter of Examples 27-29 includes, wherein the error term comprises a noise term representing possible differences between the signal value and the environmental value, and wherein the source reliability term and the source-sink relation term represent multiplicative noise terms.

In Example 31, the subject matter of Examples 27-30 includes, wherein the sink device comprises a sink motor vehicle.

In Example 32, the subject matter of Example 31 includes, wherein the instructions to provide the output representing the signal value comprise instructions which, when executed by the processing hardware, cause the processing hardware to: provide the output representing the signal value for display at a display panel of the sink motor vehicle.

In Example 33, the subject matter of Examples 31-32 includes, wherein the instructions to provide the output representing the signal value comprise instructions which, when executed by the processing hardware, cause the processing hardware to: make a motor vehicle operation decision for the sink motor vehicle based on the signal value.

In Example 34, the subject matter of Example 33 includes, wherein the motor vehicle operation decision comprises one or more of: adjusting a speed of the motor vehicle or adjusting a trajectory of the motor vehicle.

In Example 35, the subject matter of Examples 27-34 includes, wherein the source device comprises a source motor vehicle, an infrastructure device, or a pedestrian device.

In Example 36, the subject matter of Examples 27-35 includes, the memory device further storing instructions which, when executed by the processing hardware, cause the processing hardware to: determine, for the source device and the sink device, the source-sink relation term using machine learning.

In Example 37, the subject matter of Example 36 includes, the machine learning taking into account features of a plurality of past signal values from devices having a device type of the source device to devices having a device type of the sink device, the features comprising an indicated reliability of the plurality of past signal values.

In Example 38, the subject matter of Examples 36-37 includes, the machine learning taking into account features of a plurality of past signal values for a same environmental value from devices having a device type of the source device to devices having a device type of the sink device, the features comprising a standard deviation of the plurality of past signal values for the same environmental value.

In Example 39, the subject matter of Examples 27-38 includes, wherein instructions to provide the output representing the signal value in response to the determination that the signal value is reliable comprise instructions which, when executed by the processing hardware, cause the processing hardware to: provide the output representing the signal value in response to determinations that the signal value is reliable, the signal value is authenticated, and a time difference between a current time and a timestamp of the signal value is less than a threshold time difference.

In Example 40, the subject matter of Examples 27-39 includes, wherein the sink device comprises a User Equipment (UE).

In Example 41, the subject matter of Examples 27-40 includes, wherein the source device comprises a User Equipment (UE).

In Example 42, the subject matter of Examples 27-41 includes, wherein instructions to determine, based on the distribution for the environmental value, whether the signal value is reliable comprise instructions which, when executed by the processing hardware, cause the processing hardware to: determine whether the signal value is reliable based on a standard deviation or a range of the distribution for the environmental value.

In Example 43, the subject matter of Examples 27-42 includes, the storage device.

In Example 44, the subject matter of Examples 27-43 includes, wherein the sink device comprises the machine.

In Example 45, the subject matter of Examples 27-44 includes, wherein the sink device is external to and distinct from the machine.

Example 46 is at least one machine-readable medium for source-sink communication storing instructions which, when executed by processing hardware of a machine, cause the processing hardware to: receive, from a source device, a signal value for provision to a sink device, the signal value corresponding to a measurement of an environmental value; access, from a storage device, an error term for the signal value; access, from the storage device, a source reliability term for the source device; access, from the storage device, a source-sink relation term based on the source device and the sink device; determine a distribution for the environmental value based on the error term, the source reliability term, and the source-sink relation term; determine, based on the distribution for the environmental value, whether the signal value is reliable; provide an output representing the signal value in response to a determination that the signal value is reliable; and forgo providing the output representing the signal value in response to a determination that the signal value is not reliable.

In Example 47, the subject matter of Example 46 includes, wherein the source-sink relation term is stored in a table at the storage device, the table having a first dimension representing a manufacturer or device identifier of the source device and a second dimension representing a manufacturer or device identifier of the sink device.

In Example 48, the subject matter of Examples 46-47 includes, wherein the error term comprises a noise term representing possible differences between the signal value and the environmental value, and wherein the source reliability term and the source-sink relation term represent additive noise terms.

In Example 49, the subject matter of Examples 46-48 includes, wherein the error term comprises a noise term representing possible differences between the signal value and the environmental value, and wherein the source reliability term and the source-sink relation term represent multiplicative noise terms.

In Example 50, the subject matter of Examples 46-49 includes, wherein the sink device comprises a sink motor vehicle.

In Example 51, the subject matter of Example 50 includes, wherein the instructions to provide the output representing the signal value comprise instructions which, when executed by the processing hardware, cause the processing hardware to: provide the output representing the signal value for display at a display panel of the sink motor vehicle.

In Example 52, the subject matter of Examples 50-51 includes, wherein the instructions to provide the output representing the signal value comprise instructions which, when executed by the processing hardware, cause the processing hardware to: make a motor vehicle operation decision for the sink motor vehicle based on the signal value.

In Example 53, the subject matter of Example 52 includes, wherein the motor vehicle operation decision comprises one or more of adjusting a speed of the motor vehicle or adjusting a trajectory of the motor vehicle.

In Example 54, the subject matter of Examples 46-53 includes, wherein the source device comprises a source motor vehicle, an infrastructure device, or a pedestrian device.

In Example 55, the subject matter of Examples 46-54 includes, storing instructions which, when executed by the processing hardware, cause the processing hardware to: determine, for the source device and the sink device, the source-sink relation term using machine learning.

In Example 56, the subject matter of Example 55 includes, the machine learning taking into account features of a plurality of past signal values from devices having a device type of the source device to devices having a device type of the sink device, the features comprising an indicated reliability of the plurality of past signal values.

In Example 57, the subject matter of Examples 55-56 includes, the machine learning taking into account features of a plurality of past signal values for a same environmental value from devices having a device type of the source device to devices having a device type of the sink device, the features comprising a standard deviation of the plurality of past signal values for the same environmental value.

In Example 58, the subject matter of Examples 46-57 includes, wherein instructions to provide the output representing the signal value in response to the determination that the signal value is reliable comprise instructions which, when executed by the processing hardware, cause the processing hardware to: provide the output representing the signal value in response to determinations that the signal value is reliable, the signal value is authenticated, and a time difference between a current time and a timestamp of the signal value is less than a threshold time difference.

In Example 59, the subject matter of Examples 46-58 includes, wherein the sink device comprises a User Equipment (UE).

In Example 60, the subject matter of Examples 46-59 includes, wherein the source device comprises a User Equipment (UE).

In Example 61, the subject matter of Examples 46-60 includes, wherein instructions to determine, based on the distribution for the environmental value, whether the signal value is reliable comprise instructions which, when executed by the processing hardware, cause the processing hardware to: determine whether the signal value is reliable based on a standard deviation or a range of the distribution for the environmental value.

In Example 62, the subject matter of Examples 46-61 includes, the storage device.

In Example 63, the subject matter of Examples 46-62 includes, wherein the sink device comprises the machine.

In Example 64, the subject matter of Examples 46-63 includes, wherein the sink device is external to and distinct from the machine.

Example 65 is a method for source-sink communication comprising: receiving, from a source device, a signal value for provision to a sink device, the signal value corresponding to a measurement of an environmental value; accessing, from a storage device, an error term for the signal value; accessing, from the storage device, a source reliability term for the source device; accessing, from the storage device, a source-sink relation term based on the source device and the sink device; determining a distribution for the environmental value based on the error term, the source reliability term, and the source-sink relation term; determining, based on the distribution for the environmental value, whether the signal value is reliable; providing an output representing the signal value in response to a determination that the signal value is reliable; and forgoing providing the output representing the signal value in response to a determination that the signal value is not reliable.

In Example 66, the subject matter of Example 65 includes, wherein the source-sink relation term is stored in a table at the storage device, the table having a first dimension representing a manufacturer or device identifier of the source device and a second dimension representing a manufacturer or device identifier of the sink device.

In Example 67, the subject matter of Examples 65-66 includes, wherein the error term comprises a noise term representing possible differences between the signal value and the environmental value, and wherein the source reliability term and the source-sink relation term represent additive noise terms.

In Example 68, the subject matter of Examples 65-67 includes, wherein the error term comprises a noise term representing possible differences between the signal value and the environmental value, and wherein the source reliability term and the source-sink relation term represent multiplicative noise terms.

In Example 69, the subject matter of Examples 65-68 includes, wherein the sink device comprises a sink motor vehicle.

In Example 70, the subject matter of Example 69 includes, wherein providing the output representing the signal value comprises: providing the output representing the signal value for display at a display panel of the sink motor vehicle.

In Example 71, the subject matter of Examples 69-70 includes, wherein providing the output representing the signal value comprises: making a motor vehicle operation decision for the sink motor vehicle based on the signal value.

In Example 72, the subject matter of Example 71 includes, wherein the motor vehicle operation decision comprises one or more of: adjusting a speed of the motor vehicle or adjusting a trajectory of the motor vehicle.

In Example 73, the subject matter of Examples 65-72 includes, wherein the source device comprises a source motor vehicle, an infrastructure device, or a pedestrian device.

In Example 74, the subject matter of Examples 65-73 includes, determining, for the source device and the sink device, the source-sink relation term using machine learning.

In Example 75, the subject matter of Example 74 includes, the machine learning taking into account features of a plurality of past signal values from devices having a device type of the source device to devices having a device type of the sink device, the features comprising an indicated reliability of the plurality of past signal values.

In Example 76, the subject matter of Examples 74-75 includes, the machine learning taking into account features of a plurality of past signal values for a same environmental value from devices having a device type of the source device to devices having a device type of the sink device, the features comprising a standard deviation of the plurality of past signal values for the same environmental value.

In Example 77, the subject matter of Examples 65-76 includes, wherein providing the output representing the signal value in response to the determination that the signal value is reliable comprises: providing the output representing the signal value in response to determinations that the signal value is reliable, the signal value is authenticated, and a time difference between a current time and a timestamp of the signal value is less than a threshold time difference.

In Example 78, the subject matter of Examples 65-77 includes, wherein the sink device comprises a User Equipment (UE).

In Example 79, the subject matter of Examples 65-78 includes, wherein the source device comprises a User Equipment (UE).

In Example 80, the subject matter of Examples 65-79 includes, wherein determining, based on the distribution for the environmental value, whether the signal value is reliable comprises: determining whether the signal value is reliable based on a standard deviation or a range of the distribution for the environmental value.

Example 81 is a system for source-sink communication comprising: processing hardware of a machine; and a memory device storing instructions which, when executed by the processing hardware, cause the processing hardware to perform the method of any of Examples 65-80.

Example 82 is at least one machine-readable for source-sink communication medium storing instructions which, when executed by processing hardware of a machine, cause the processing hardware to perform the method of any of Examples 65-80.

Example 83 is an apparatus for source-sink communication comprising: means for receiving, from a source device, a signal value for provision to a sink device, the signal value corresponding to a measurement of an environmental value; means for accessing, from a storage device, an error term for the signal value; means for accessing, from the storage device, a source reliability term for the source device; means for accessing, from the storage device, a source-sink relation term based on the source device and the sink device; means for determining a distribution for the environmental value based on the error term, the source reliability term, and the source-sink relation term; means for determining, based on the distribution for the environmental value, whether the signal value is reliable; means for providing an output representing the signal value in response to a determination that the signal value is reliable; and means for forgoing providing the output representing the signal value in response to a determination that the signal value is not reliable.

In Example 84, the subject matter of Example 83 includes, wherein the source-sink relation term is stored in a table at the storage device, the table having a first dimension representing a manufacturer or device identifier of the source device and a second dimension representing a manufacturer or device identifier of the sink device.

In Example 85, the subject matter of Examples 83-84 includes, wherein the error term comprises a noise term representing possible differences between the signal value and the environmental value, and wherein the source reliability term and the source-sink relation term represent additive noise terms.

In Example 86, the subject matter of Examples 83-85 includes, wherein the error term comprises a noise term representing possible differences between the signal value and the environmental value, and wherein the source reliability term and the source-sink relation term represent multiplicative noise terms.

In Example 87, the subject matter of Examples 83-86 includes, wherein the sink device comprises a sink motor vehicle.

In Example 88, the subject matter of Example 87 includes, wherein the means for providing the output representing the signal value comprise: means for providing the output representing the signal value for display at a display panel of the sink motor vehicle.

In Example 89, the subject matter of Examples 87-88 includes, wherein the means for providing the output representing the signal value comprise: means for making a motor vehicle operation decision for the sink motor vehicle based on the signal value.

In Example 90, the subject matter of Example 89 includes, wherein the motor vehicle operation decision comprises one or more of: adjusting a speed of the motor vehicle or adjusting a trajectory of the motor vehicle.

In Example 91, the subject matter of Examples 83-90 includes, wherein the source device comprises a source motor vehicle, an infrastructure device, or a pedestrian device.

In Example 92, the subject matter of Examples 83-91 includes, means for determining, for the source device and the sink device, the source-sink relation term using machine learning.

In Example 93, the subject matter of Example 92 includes, the machine learning taking into account features of a plurality of past signal values from devices having a device type of the source device to devices having a device type of the sink device, the features comprising an indicated reliability of the plurality of past signal values.

In Example 94, the subject matter of Examples 92-93 includes, the machine learning taking into account features of a plurality of past signal values for a same environmental value from devices having a device type of the source device to devices having a device type of the sink device, the features comprising a standard deviation of the plurality of past signal values for the same environmental value.

In Example 95, the subject matter of Examples 83-94 includes, wherein the means for providing the output representing the signal value in response to the determination that the signal value is reliable comprise: means for providing the output representing the signal value in response to determinations that the signal value is reliable, the signal value is authenticated, and a time difference between a current time and a timestamp of the signal value is less than a threshold time difference.

In Example 96, the subject matter of Examples 83-95 includes, wherein the sink device comprises a User Equipment (UE).

In Example 97, the subject matter of Examples 83-96 includes, wherein the source device comprises a User Equipment (UE).

In Example 98, the subject matter of Examples 83-97 includes, wherein the means for determining, based on the distribution for the environmental value, whether the signal value is reliable comprise: means for determining whether the signal value is reliable based on a standard deviation or a range of the distribution for the environmental value.

Example 99 is at least one machine-readable medium including instructions that, when executed by processing circuitry, cause the processing circuitry to perform operations to implement of any of Examples 1-98.

Example 100 is an apparatus comprising means to implement of any of Examples 1-98.

Example 101 is a system to implement of any of Examples 1-98.

Example 102 is a method to implement of any of Examples 1-98.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A system for source-sink communication comprising:
processing hardware of a machine; and
a memory device storing instructions which, when executed by the processing hardware, cause the processing hardware to:
receive, from a source device, a signal value for provision to a sink device, the signal value corresponding to a measurement, by a sensor of the source device, of an environmental value;
access, from a storage device, an error term for the signal value;
access, from the storage device, a source reliability term for the source device;
access, from the storage device, a source-sink relation term based on the source device and the sink device;
determine a distribution for the environmental value based on the error term, the source reliability term, and the source-sink relation term, wherein the distribution is a statistical distribution of a true value for the environmental value;
determine, based on the distribution for the environmental value, whether the signal value is reliable;
provide an output representing the signal value in response to a determination that the signal value is reliable; and
forgo providing the output representing the signal value in response to a determination that the signal value is not reliable.

2. The system of claim 1, wherein the source-sink relation term is stored in a table at the storage device, the table having a first dimension representing a manufacturer or device identifier of the source device and a second dimension representing a manufacturer or device identifier of the sink device.

3. The system of claim 1, wherein the error term comprises a noise term representing possible differences between the signal value and the environmental value, and wherein the source reliability term and the source-sink relation term represent additive noise terms.

4. The system of claim 1, wherein the error term comprises a noise term representing possible differences between the signal value and the environmental value, and wherein the source reliability term and the source-sink relation term represent multiplicative noise terms.

5. The system of claim 1, wherein the sink device comprises a sink motor vehicle.

6. The system of claim 5, wherein the instructions to provide the output representing the signal value comprise instructions which, when executed by the processing hardware, cause the processing hardware to:
provide the output representing the signal value for display at a display panel of the sink motor vehicle.

7. The system of claim 5, wherein the instructions to provide the output representing the signal value comprise instructions which, when executed by the processing hardware, cause the processing hardware to:
make a motor vehicle operation decision for the sink motor vehicle based on the signal value.

8. The system of claim 7, wherein the motor vehicle operation decision comprises one or more of: adjusting a speed of the motor vehicle or adjusting a trajectory of the motor vehicle.

9. The system of claim 1, wherein the source device comprises a source motor vehicle, an infrastructure device, or a pedestrian device.

10. The system of claim 1, the memory device further storing instructions when executed by the processing hardware, cause the processing hardware to:
determine, for the source device and the sink device, the source-sink relation term using machine learning.

11. The system of claim 10, the machine learning taking into account, features of a plurality of past signal values from devices having a device type of the source device to devices having a device type of the sink device, the features comprising an indicated reliability of the plurality of past signal values.

12. The system of claim 10, the machine learning taking into account features of a plurality of past signal values for a same environmental value from devices having a device type of the source device to devices having a device type of the sink device, the features comprising a standard deviation of the plurality of past signal values for the same environmental value.

13. The system of claim 1, wherein instructions to provide the output representing the signal value in response to the determination that the signal value is reliable comprise instructions which, when executed by the processing hardware, cause the processing hardware to:
provide the output representing the signal value in response to determinations that the signal value is reliable, the signal value is authenticated, and a time difference between a current time and a timestamp of the signal value is less than a threshold time difference.

14. The system of claim 1, wherein the sink device comprises a User Equipment (UE).

15. At least one non-transitory machine-readable medium for source-sink communication storing instructions which, when executed by processing hardware of a machine, cause the processing hardware to:
receive, from a source device, a signal value for provision to a sink device, the signal value corresponding to a measurement, by a sensor of the source device, of an environmental value;
access, from a storage device, an error term for the signal value;
access, from the storage device, a source reliability term for the source device;
access, from the storage device, a source-sink relation term based on the source device and the sink device;
determine a distribution for the environmental value based on the error term, the source reliability term, and the source-sink relation term, wherein the distribution is a statistical distribution of a true value for the environmental value;
determine, based on the distribution for the environmental value, whether the signal value is reliable;
provide an output representing the signal value in response to a determination that the signal value is reliable; and
forgo providing the output representing the signal value in response to a determination that the signal value is not reliable.

16. The machine-readable medium of claim 15, wherein the source-sink relation is stored in a table at the storage device, the table having a first dimension representing a manufacturer or device identifier of the source device and a second dimension representing a manufacturer or device identifier of the sink device.

17. A method for source-sink communication comprising:
receiving, from a source device, a signal value for provision to a sink device, the signal value corresponding to a measurement, by a sensor of the source device, of an environmental value;
accessing, from a storage device, an error term for the signal value;
accessing, from the storage device, a source reliability term for the source device;
accessing, from the storage device, a source-sink relation term based on the source device and the sink device;
determining a distribution for the environmental value based on the error term, the source reliability term, and the source-sink relation term, wherein the distribution is a statistical distribution of a true value for the environmental value;
determining, based on the distribution for the environmental value, whether the signal value is reliable;
providing an output representing the signal value in response to a determination that signal value is reliable; and
forgoing providing the output representing the signal value in response to a determination that the signal value is not reliable.

18. The method of claim 17, wherein the source-sink relation term is stored in a table at the storage device, the table having a first dimension representing a manufacturer or device identifier of the source device and a second dimension representing a manufacturer or device identifier of the sink device.

19. The at least one non-transitory machine-readable medium of claim 15, wherein the error term comprises a noise term representing possible differences between the signal value and the environmental value, and wherein the source reliability term and the source-sink relation term represent additive noise terms.

20. The at least one non-transitory machine-readable medium of claim 15, wherein the error term comprises a noise term representing possible differences between the signal value and the environmental value, and wherein the source reliability term and the source-sink relation term represent multiplicative noise terms.

21. The at least one non-transitory machine-readable medium of claim 15, wherein the sink device comprises a sink motor vehicle.

22. The at least one non-transitory machine-readable medium of claim 21, wherein the instructions to provide the output representing the signal value comprise instructions which, when executed by the processing hardware, cause the processing hardware to:
provide the output representing the signal value for display at a display panel of the sink motor vehicle.

23. The at least one non-transitory machine-readable medium of claim 21, wherein the instructions to provide the output representing the signal value comprise instructions which, when executed by the processing hardware, cause the processing hardware to:
make a motor vehicle operation decision for the sink motor vehicle based on the signal value.

24. The at least one non-transitory machine-readable medium of claim 23, wherein the motor vehicle operation decision comprises one or more of: adjusting a speed of the motor vehicle or adjusting a trajectory of the motor vehicle.

25. The at least one non-transitory machine-readable medium of claim 15, wherein the source device comprises a source motor vehicle, an infrastructure device, or a pedestrian device.

* * * * *